April 8, 1952 R. H. HERRICK 2,591,937

SELECTIVE CALLING SYSTEM

Filed May 1, 1947

INVENTOR.
ROSWELL H. HERRICK

BY Chas. W. Candy

ATTORNEY

Patented Apr. 8, 1952

2,591,937

UNITED STATES PATENT OFFICE 2,591,937

SELECTIVE CALLING SYSTEM

Roswell H. Herrick, Lorain, Ohio, assignor to Automatic Electric Laboratories, Inc., Chicago, Ill., a corporation of Delaware Application May 1, 1947, Serial No. 745,202

12 Claims. (Cl. 177—353)

The present invention relates to signaling systems, and more particularly to a selective calling system for calling a large number of subsidiary stations from a master station.

The object of this invention is to provide a novel signaling system of extremely simple design for easy, reliable selection by a master station of any of a group of subsidiary stations and is especially adapted for use with mobile radio systems.

The object of this invention is accomplished by the provision of a novel circuit for use with a signal from a remote point comprising a plurality of frequencies applied simultaneously or successively to control the operation of a group of tuned relays for producing a calling signal.

Figure 1:
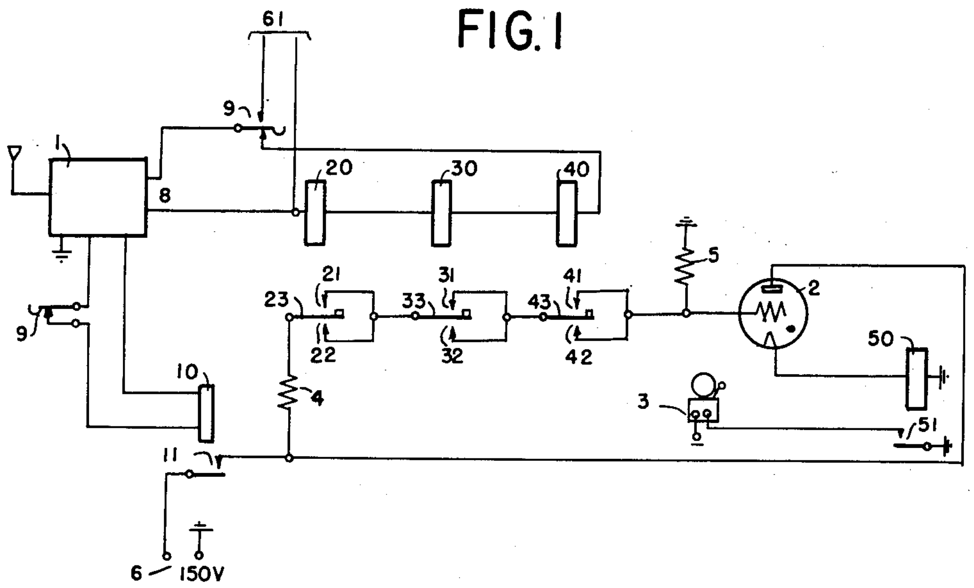

Referring now to the drawing, Figure 1 illustrates one of a group of radio receiving sets which embodies the features of the invention, and comprises a radio receiver 1, an audio output circuit 8 which includes reed type relays 20, 30, and 40 connected in series, and a gas tube 2 having its grid circuit connected to and controlled by the contacts on said reed relays and resistors 4 and 5, and having its plate, cathode circuit connected in series with control relay 50, a squelch relay 10, connected to the receiver 1, a buzzer 3 controlled to operate by contacts on the control relay 50, and a hookswitch 9 in the audio circuit for switching the receiver output from the calling signal equipment to the telephone line 61.

Figure 2:
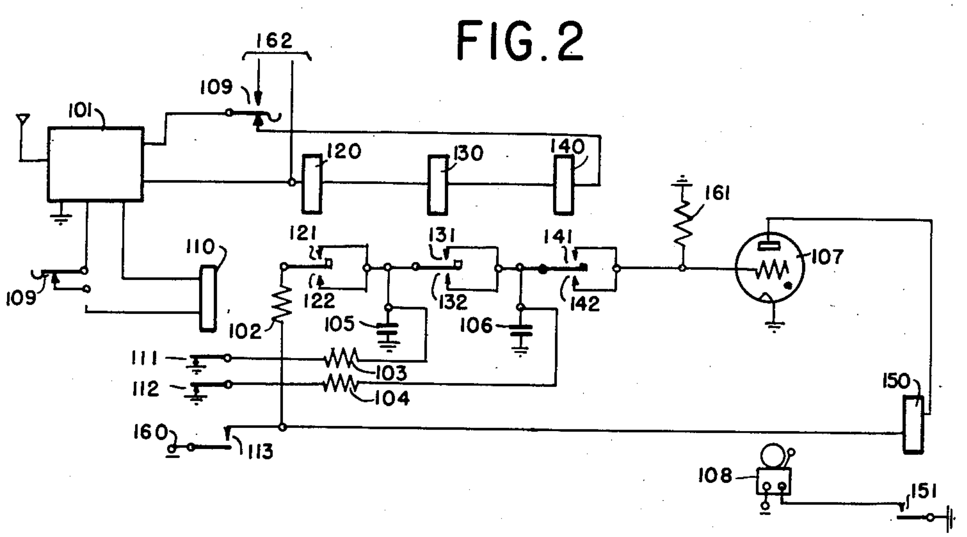

Figure 2, which is a modification of the arrangement illustrated in Figure 1, comprises a radio receiver set 101, an audio output circuit of said receiver connected to the reed type relays 120, 130, and 140 in series, a gas tube 107 having its grid circuit connected to and controlled by the contacts on the reed relays, resistors 102, 103, 104, and 161, condensers 105 and 106 and the contacts on squelch relay 110, a buzzer 108, and a hookswitch 109 for switching the receiver output from the signal equipment to the telephone line 162.

The arrangement illustrated in Figure 1 is selectively seized responsive to a combination group of tones transmitted simultaneously, and in the preferred embodiment is one of a group of stations under the control of a transmitter capable of producing ten different frequencies and transmitting the frequencies three at a time. The greatest number of possible combinations where there are "n" available tones used "a" at a time will be equal to:

$$\frac{n(n-1)(n-2)\ .\ .\ .\ (n-a+1)}{(1)(2)(3)\ .\ .\ .\ (a)}$$

or $$\frac{(10)(9)(8)}{(6)}=120 \text{ tones}$$

It is possible therefore to use 120 stations in a system, each having similar connections to the arrangement illustrated in Figure 1, and each station having the relays 10, 20, and 30 tuned to a different combination of the ten frequencies.

Referring more particularly to Figure 1, it will now be assumed that a carrier frequency is transmitted from a central station and is received by the antennae of all the receiving stations in the system. Squelch relay 10 in all sets operates responsive to receipt of the carrier frequency and at its contacts 11 connects a potential supply to the plate-cathode circuit of the tube 2. The tube is of the type which establishes an arc on application of a voltage between the grid and the cathode, which in turn spreads to the anode. The tube is therefore inoperative at this time. The incoming carrier frequency modulated at the transmitter with three of the ten tones is now received over the incoming connections of all sets and the receiving set which contains the three relays which are tuned to the three tones transmitted will be set in operation. Assuming the call is for the illustrated station, the tuned relays 20, 30, and 40 will be operated by the audio frequencies applied over the audio output circuit and hookswitch 61. The contact members 23, 33, and 43 will be set into operation responsive to the operation of the relays and make contact with their associated contacts at a speed commensurate with the cycle of the applied tones. A circuit will be completed one or more times from the 150 volt source through resistance 4, the associated contacts of relays 20, 30, and 40, and resistance 5 during the application of the signal. Resistance 4 is connected in the circuit to protect the relay contacts in case of accidental shorts and to limit the current in the circuit when the contacts are closed simultaneously. The voltage across resistance 5 on simultaneous completion of the operating circuit through the contacts is also across the grid of the gas tube 2.

Tube 2 establishes an arc on application of this voltage between the grid and cathode, which then spreads to the anode. The resultant anode current energizes relay 50 which operates and at its contacts 51 completes an operating circuit to the buzzer 3 to produce the calling signal. The signaling circuit is opened in two places when the called party removes the receiver from the hookswitch 9. The receiver audio output is disconnected from the calling equipment and connected instead to the telephone line 61, and the squelch relay operating circuit from the receiver is opened. The squelch relay 10 restores and at its contacts 11 opens the operating circuit for gas tube 2 and relay 50. Relay 50 in turn restores and at its contacts 51 opens the operating circuit to buzzer 3. On completion of the call, the receiver is replaced on the hookswitch and the set is in condition for receipt of a subsequent signal. The values of resistances 4 and 5 are proportioned by design so that the peak voltages across resistance 5 due to the momentary simultaneous closing of the contacts of the three relays will exceed the critical grid voltage for the tube 2 and will also allow sufficient grid current for transferring the arc to the anode. A general call signal can be completed by simultaneous application of all ten tones to the carrier wave, which will cause operation of all the tuned relays and their associated buzzer circuits at all stations in a manner heretofore described.

A circuit of this type is especially well adopted for a car installation where battery drain is a serious source of trouble. It will be noted that the circuit is in a standby condition, whenever it is not the called station. There is no drain on the high voltage source while in the standby condition as relays 20, 30, and 40 do not complete a circuit to the gas tube 2.

The arrangement in Figure 2 is a modification of Figure 1 wherein a group of tones is used in permutation, rather than in combination as disclosed heretofore. In this manner the number of individual station selections available is vastly increased. In order to call a particular station, the transmitted carrier wave is modulated by a selective signal consisting of a number of successive pulses of different audio frequencies. In the preferred arrangement, ten frequencies are available, and three tones are successively transmitted for each signal. Accordingly, the number of available stations will be equal to $M=n(n-1)\ (n-2)\ \ldots\ (n-p+1)$ where M is the permutation of $n$ things taken $p$ at a time, or $M=10(10-1)\ (10-3+1)=720$ stations. The connections in the 720 receiver stations will be identical to those in the arrangement illustrated in Figure 2, the only difference being in the frequency values of the relays and the order of precedence in which they are connected.

Assuming now that a carrier frequency has been transmitted, the radio receiver at each set picks up the wave over its associated antenna. The squelch relay 110 in each station is operated responsive to receipt of the carrier wave and at its contacts 111 and 112 prepares the release portion of the signaling circuit, and at its contacts 113 connects a source of battery potential 160 to the signaling circuit. When the signal is modulated at the transmitter with the first frequency of the signal, the audio output of the receiver set 101 is applied to the three relays at each station. The particular relays tuned to that frequency will vibrate responsive thereto and close their associated contacts once for each cycle of the audio frequency. Only those stations having the first reed relay in the arrangement responsive to the first of the three incoming frequencies will accomplish any purpose. It will be apparent from the figure and further disclosure that the relays will respond whenever their particular frequency is received by the set, but the signaling circuit will be completed only if all three relays 120, 130, and 140 are operated in the successive order in which they are connected in the circuit. Assuming now that the incoming signal is intended for the set illustrated in Figure 2. Relay 120 vibrates responsive to the first audio frequency and at its contacts 121 and 122 intermittently closes a charging circuit to condenser 105 from potential source 160 over contacts 113, resistor 102, and contacts 121 and 122. Condenser 105 absorbs the charge. On receipt of the second incoming frequency of the signal, relay 130 will vibrate responsive to the frequency and at its contacts 131 and 132 intermittently close a circuit from condenser 105 to condenser 106 to transfer the charge thereto. When the third incoming signal frequency is received, relay 140 will be operated and at its contacts 141 and 142 intermittently close a circuit from condenser 106 to resistance 161 and the grid of the gas tube 107. The voltage across resistance 161 is also across the grid of the gas tube. Tube 107 establishes an arc on application of this voltage between the grid and the cathode, which then spreads to the anode. The resultant anode current energizes relay 150 which operates and at its contacts 151 completes a circuit to the buzzer 108.

The buzzer operates until the buzzer circuit is opened as a result of the called party removing his receiver. It is apparent that the switchhook 109 could be placed in any of the operating circuits to leave any portions of the arrangement operated if so desired. In the preferred embodiment, however, when the receiver is removed from hookswitch 109, the audio output circuit of receiver 101 is disconnected from the calling signal equipment and connected instead to the telephone line 162. The hookswitch 109 also opens the operating circuit to squelch relay 110 which restores and at its contacts 113 opens the operating circuit to gas tube 107 and relay 150. Relay 150 restores and at its contacts 151 opens the buzzer circuit.

It is apparent from the figure that condenser 106 will have an accumulated charge on completion of the incoming signal whenever relay 120 and 130 are operated responsive to a signal having their respective frequencies in the same order, and the third frequency is of a different value than the value to which relay 140 is tuned. If only the first relay 120 is operated, condenser 105 will have an accumulated charge when the signal is completed. However, when the squelch relay 110 is released in a manner heretofore described, it closes a circuit for discharging the condensers 105 and 106 over resistors 103 and 104 and contacts 111 and 112 respectively. On discharge of the condensers, the set is once more restored to its normal receiving condition for use with subsequent calls.

A general call can be accomplished by transmitting the ten tones simultaneously for several seconds. This will operate the reed relays of all frequencies and produce a signal at each of the 720 stations. Resistances 102 and 161 are proportioned by design so that the peak voltage across resistance 161 due to the momentary simultaneous closure of the three relays responsive to the general call will exceed the critical grid voltage for tube 107 and will also allow sufficient grid current for transferring the arc to the anode. Resistance 102 is also inserted in the charging circuit to condenser 105 to prevent excessive sparking at the contacts of the tuned relays.

Although the invention has been illustrated by a particular embodiment thereof, it should be apparent that numerous modifications may be made therein without departing from the true spirit and scope of the invention as defined in the subjoined claims.

What is claimed is:

1. In a signaling circuit, receiving means over which an incoming signal comprising a plurality of simultaneous predetermined frequencies is received, a plurality of reed relays, the windings of said relays being connected in series and to said receiving means, each of said relays tuned to a different one of said predetermined frequencies and all of said relays simultaneously operated responsive to receipt of said signal, a gas tube, an energizing circuit for said tube including a source of potential, circuit controlling armatures on said relays serially connected in said energizing circuit, each operated once for each cycle of the energizing frequency applied to their associated relays to intermittently open and close a portion of said energizing circuit, a control relay operated responsive to said incoming signal to connect said source of potential to said energizing circuit, said energizing circuit thereby closed through all of said contacts at least once during application of said signal to energize said gas tube, and means operated responsive to energization of said tube to transmit a calling signal.

2. In a signaling circuit, receiving means over which the circuit is seized, a source of potential, a gas tube having a grid, said tube energized responsive to energization of the grid, an energizing circuit for said grid, a control relay operated responsive to seizure of the signaling circuit contacts closed responsive to the operation of said relay to connect said potential source to a portion of said energizing circuit, an incoming signal comprising at least three predetermined frequencies received over said means, a group of relays operated responsive to said signal, circuit controlling means connected in said energizing circuit controlled by said relays to operate once for each cycle of the frequency applied to the associated relay to intermittently open and close a portion of said circuit, said circuit thereby closed at least once during said signal by said intermittently operated circuit controlling means to energize said tube, and a signal relay operated responsive to energization of the tube to transmit a calling signal.

3. In a selective signaling system wherein different signals each including as a part thereof a different combination of simultaneously applied frequencies of audio frequency currents are transmitted to a plurality of receiving stations, a receiving means and a plurality of relays each tuned to a different one of said frequencies associated with each station, the windings of said relays in each station being connected in series in a series circuit, the relays at each station responsive to a different plurality of said frequencies, a gas tube at each station, a signal at each station controlled by the gas tube thereat, serially connected contacts on the relays at each station, said relays responsive only to the simultaneous reception thereat of a signal composed of the frequencies to which the relays thereat are tuned, and a control relay operated responsive to each signal having any combination of said plurality of frequencies included therein, said control relay to cause operation of the tube at that station and the consequent operation of the signal thereat when said serially connected contacts are simultaneously operated.

4. In a selective signaling system comprising a plurality of mobile stations having a battery supply, a plurality of relays at each station, the windings of said relays in each station being connected in series in a series circuit, each relay at a station tuned to a different frequency, each station in the system having a different combination of tuned relays, a signal comprised of a carrier wave for seizing said stations, a second signal comprised of at least three simultaneously applied frequencies for operating the station or stations having a combination of relays tuned to the frequencies of the signal transmitted, a gas tube, an energizing circuit for said tube including contacts on said relays, a control relay operated responsive to seizure of the station to connect said battery supply to said energizing circuit, said tuned relays operated by said second signal to complete the energizing circuit including said battery supply to the gas tube only for the called station or stations.

5. In a selective signaling set, a plurality of relays each tuned to a different frequency, means for receiving a signal comprised of a plurality of different successively applied frequencies, a plurality of condensers, a gas tube, said relays operated whenever said signal comprises their respective frequencies, a charging circuit for charging one of said condensers, contacts operated by one of said relays for completing said charging circuit to charge said one condenser, a transfer circuit for transferring said charge on said one condenser to another of said condensers, contacts operated by another of said relays for completing said transfer circuit to charge said other condenser, a control circuit for energizing said tube, contacts operated by a further one of said relays for connecting said control circuit to said other charged condenser to energize said tube from the charge on said other condenser, and signaling means operated responsive to energization of said gas tube.

6. In a selective signaling circuit, a plurality of relays connected in a predetermined order each tuned to a different frequency, means for receiving a signal comprised of a plurality of frequencies corresponding to the particular frequencies of the tuned relays and applied successively in a like predetermined order, a pair of condensers, a gas tube having a grid and energized responsive to energization of said grid, a charging circuit for charging one of said condensers, means controlled by the first of said relays when operated responsive to an application of its particular frequency to close said charging circuit to said one of said condensers and to terminate said charging on termination of the applied operating frequency, a transfer circuit for transferring said charge on said one condenser to the other of said condensers, means controlled by said second relay operated responsive to operation of same during application of its particular frequency to close said circuit to transfer the charge from said one condenser to said other condenser, and means controlled by the third of said relays when operated during application of its particular frequency to transfer said charge on said other condenser to the grid of said tube to energize same, and signaling means operated responsive to energization of said gas tube.

7. In a selective signaling set as claimed in claim 5, a seizure relay operated responsive to seizure of the set to prepare said charging circuit, a discharge circuit for each of said plurality of condensers for discharging same whenever any of the condensers are left with a charge due to partial operation of said tuned relays, said seizure relay restored responsive to release of the set, and means operated responsive to release of the seizure relay to complete said discharge circuits simultaneously to prepare the circuit for a subsequent seizure and signal.

8. In a signaling system for a plurality of radio receiving sets, a series of tuned reed relays connected in series in the output circuit of each set, the relays at each set tuned to respond to different frequencies of audio frequency current, vibrating contacts on each relay, a gas tube at each set having a normally inoperative plate circuit including a signal relay, a grid circuit for applying potential to the grid of said tube to cause said plate circuit to become effective, a starting signal comprising a current of another frequency, said grid circuit including means in all of said radio receiving sets responsive to said starting signal to apply said potential to said grid circuit in each set, said tuned reed relays at one set responsive only upon reception of a signal including the frequencies to which all the relays thereat are responsive to momentarily close their contacts to jointly apply said potential to said tube at that set to cause operation of the relay in its plate circuit.

9. In a system as claimed in claim 8, in which a single signal is received comprising all the frequencies employed in the system, all of the tuned relays at each of said sets thereby operated to give a signal at their associated set.

10. In a signaling system, receiving means over which an incoming signal comprising a plurality of simultaneous predetermined frequencies is received, a plurality of reed relays connected to said receiving means, each of said relays tuned to a different one of said predetermined frequencies and all of said relays simultaneously operated responsive to receipt of said signal, a call signaling circuit including a source of potential and signaling means responsive to said source of potential, means for completing said signaling circuit, an energizing circuit for actuating said completing means, said energizing circuit comprising circuit controlling armatures on said relays serially connected therein and connected to said signaling circuit completing means, each of said circuit controlling armatures operated once for each cycle of the energizing frequency applied to their associated relays to intermittently open and close a portion of said energizing circuit, a second source of potential and a control relay responsive to said incoming signal, armature contacts of said control relay connecting said second source of potential to said circuit controlling armatures and thereby energizing said signaling circuit completing means.

11. In a selecting signaling system wherein different signals each including as a part thereof a different combination of simultaneously applied frequencies of audio frequency currents are transmitted to a plurality of receiving stations, a receiving means and a plurality of relays each tuned to a different one of said frequencies associated with each station, the relays in each station responsive to a different plurality of said frequencies, a call signaling circuit including a signal and a signal actuator, an energizing circuit for said actuator comprising contacts on said relays and a source of potential, a control relay, said control relay operated responsive to any of said different signals independent of the audio frequencies included therein to connect said source of potential to said energizing circuit, serially connected contacts on the relays at each station responsive only to the simultaneous reception thereat of a signal composed of the frequencies to which the relays thereat are tuned to connect the source of potential through contacts of said control relay to said signal actuator and to cause the consequent operation of the signal thereat.

12. In a signaling system, a plurality of radio receiving sets, a series of tuned relays connected on the audio output of each set, the relays at each set tuned to respond to received incoming signals including different frequencies, successively applied in different predetermined orders, a control relay connected on the audio output of each set and operated responsive to the receipt of a signal including any one of said different frequencies, signaling means at each set, and means operated responsive to the operation of all of said tuned relays and said control relay for operating said signaling means, said signaling means operated in response only to a signal comprising the successively applied frequencies in the predetermined order in which the relays thereat are tuned and arranged.

ROSWELL H. HERRICK.

REFERENCES CITED

The following references are of record in the file of this patent:

UNITED STATES PATENTS

| Number | Name | Date |
|---|---|---|
| 1,547,226 | Martin | July 28, 1925 |
| 2,047,900 | Bruckel | July 14, 1936 |
| 2,052,581 | Richards | Sept. 1, 1936 |
| 2,148,578 | Pullis | Feb. 28, 1939 |
| 2,168,198 | Frink | Aug. 1, 1939 |
| 2,255,162 | Hart | Sept. 9, 1941 |
| 2,368,953 | Walsh | Feb. 6, 1943 |
| 2,388,531 | Deal | Nov. 6, 1945 |
| 2,441,145 | Hansen | May 11, 1945 |
| 2,457,149 | Herbst | Dec. 28, 1948 |

FOREIGN PATENTS

| Number | Country | Date |
|---|---|---|
| 172,321 | Great Britain | Nov. 2, 1922 |
| 261,384 | Great Britain | Oct. 6, 1927 |